United States Patent [19]
Glance

[11] Patent Number: 5,434,937
[45] Date of Patent: Jul. 18, 1995

[54] OPTICAL FILTER HAVING INTEGRATED TRANSCEIVERS

[75] Inventor: Bernard Glance, Colts Neck, N.J.

[73] Assignee: AT&T Corp., Murray Hill, N.J.

[21] Appl. No.: 152,517

[22] Filed: Nov. 16, 1993

[51] Int. Cl.$^6$ .................................................. G02B 6/28
[52] U.S. Cl. ....................................... 385/24; 359/127; 359/132; 385/46
[58] Field of Search ............... 359/124, 14, 132, 133, 359/127, 128; 385/24, 14, 15, 46

[56] References Cited

U.S. PATENT DOCUMENTS

| | | | |
|---|---|---|---|
| 4,905,218 | 2/1990 | Takeuchi et al. | 359/132 |
| 4,959,826 | 9/1990 | Smith | 359/132 |
| 5,002,350 | 3/1991 | Dragone | 350/96 |
| 5,136,671 | 8/1991 | Dragone | 385/46 |
| 5,153,762 | 10/1992 | Huber | 359/132 |

FOREIGN PATENT DOCUMENTS

| | | | |
|---|---|---|---|
| 56-149838 | 11/1981 | Japan | 359/132 |
| 63-148724 | 6/1988 | Japan | 359/132 |
| 63-203026 | 8/1988 | Japan | 359/132 |
| 2-23734 | 1/1990 | Japan | 359/132 |
| 2-65432 | 3/1990 | Japan | 359/132 |

OTHER PUBLICATIONS

Olshansky et al.; "60-Channel FM Video Subcarrier Multiplexed Optical Communication System"; Electronic Elleters; 22nd Oct. 1987, vol. 23, No. 22, pp. 1196–1198.

*Primary Examiner*—John D. Lee
*Assistant Examiner*—John Ngo
*Attorney, Agent, or Firm*—Stuart H. Mayer

[57] ABSTRACT

A monolithically integrated optical filter which is rapidly tunable over a wide optical frequency range includes an input frequency router connected to an output frequency router by means of selectively activatable transceivers. The transceivers are formed from optically active sections and electronic controllers that selectively modulate, demodulate and amplify a desired one or more of a plurality of multiplexed input optical frequencies. This filter is economical to construct and is useful in high capacity, high speed optical communications networks.

9 Claims, 2 Drawing Sheets

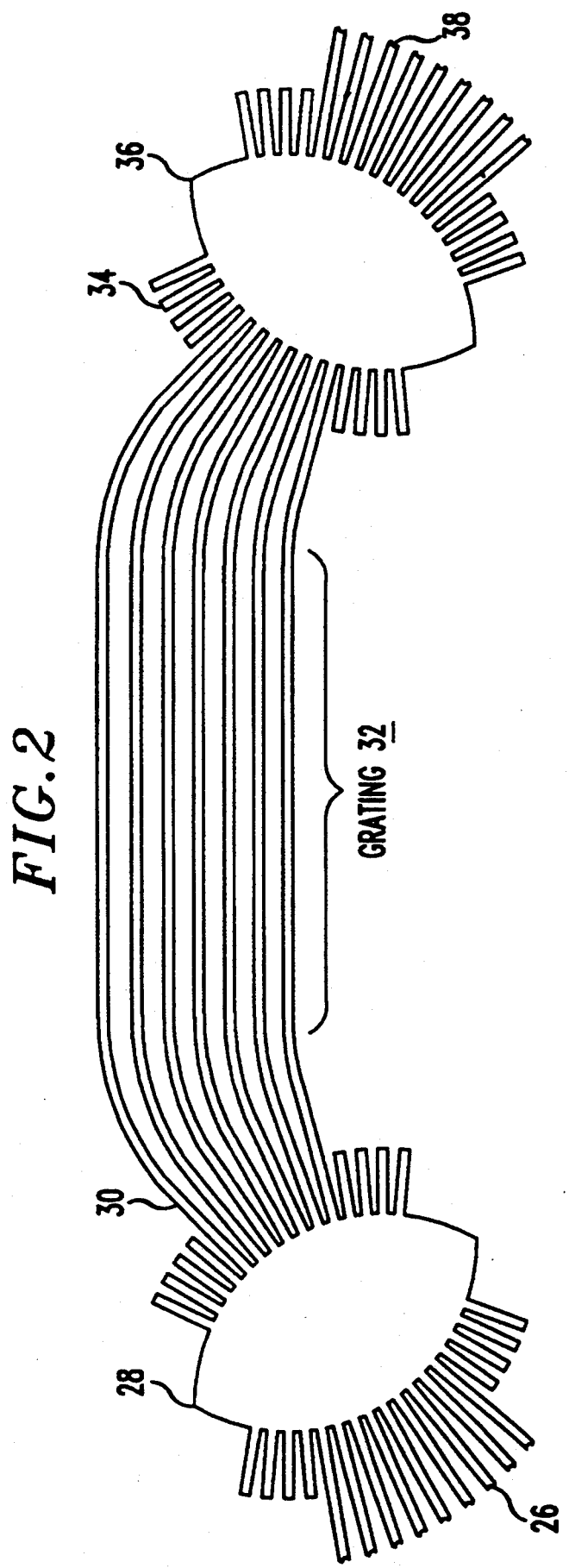

20

OPTICAL FILTER HAVING INTEGRATED TRANSCEIVERS

CROSS-REFERENCE TO RELATED APPLICATIONS

This application is related to Application Ser. No. 19,961 of Bernard Glance and Robert Wilson, entitled "Rapidly Tunable Integrated Optical Filter," filed in the Patent and Trademark Office on Feb. 19, 1993.

This application is related to Application Ser. No. 19,957 of Bernard Glance and Robert Wilson, entitled "Rapidly Tunable Wideband Integrated Optical Filter," filed in the Patent and Trademark Office on Feb. 19, 1993.

This application is related to Application Ser. No. 19,952 of Corrado Dragone and Ivan Kaminow, entitled "Rapidly Tunable Integrated Laser," filed in the Patent and Trademark Office on Feb. 19, 1993, now U.S. Pat. No. 5,373,517.

This application is related to Application Ser. No. 19,951 of Bernard Glance and Robert Wilson, entitled "Rapidly Tunable Wideband Integrated Laser," filed in the Patent and Trademark Office on Feb. 19, 1993, now U.S. Pat. No. 5,373,516.

This application is related to Application Ser. No. 08/152,511 of Corrado Dragone, Ivan P. Kaminow and Mark E. Kuznetsov entitled "Tunable Optical Waveguide Grating Arrangement" filed in the Patent and Trademark Office on the same day this application is being filed.

This application is related to Application Ser. No. 138,659 of Bernard Glance and Robert Wilson, entitled "Optical Passband Filter," filed in the Patent and Trademark Office on Oct. 18, 1993.

This application is related to application Ser. No. [Zirngibl 4] of Martin Zirngibl entitled "High-Power, Single-Frequency Tunable Laser," filed in the Patent and Trademark Office on Oct. 13, 1993.

TECHNICAL FIELD

This invention relates to optical communications systems. More particularly, this invention relates to integrated optical filters used in optical communications systems.

BACKGROUND

The capacity and speed of communications systems may be increased by transmitting information in optical form over networks composed of optically transmissive nodes, fibers, waveguides, and the like. High capacity optical communications systems require that many optical signals be frequency division multiplexed in the components of an optical network. Receivers must be configured such that a desired optical frequency may be retrieved from a group of many multiplexed optical frequencies. This necessitates the provision of suitable optical filters which separate and modulate desired optical frequencies from a frequency division multiplexed plurality of optical frequencies while also selectively modulating, demodulating, and amplifying selected ones of the demultiplexes optical frequencies. Until now, there has been no convenient approach to filtering unwanted optical frequencies from desired optical frequencies. The performance of prior tunable optical filters, based on electro-mechanical, electro-optic, acousto-optic, and magneto-optic effects, have been limited in terms of tuning speed, frequency selectivity, or tuning range. All of these prior devices also have been expensive to implement.

SUMMARY

In accordance with this invention, a rapidly tunable optical filter having integrated transceivers has been developed. The optical filter in accordance with this invention may be based upon photonic integrated circuitry which can provide a great deal of frequency selectivity and a wide tuning range which can be realized at a cost lower than that associated with implementing prior optical filters.

In one example of the invention, Applicants have employed integrated optical multiplexers and demultiplexers disclosed, for example, in U.S. Pat. Nos. 5,002,350 and 5,136,671 to create a monolithic fast optical filter having a wide tuning range. In specific terms, this example of the invention comprises two identical $1 \times N$ frequency routing devices with their frequency selective ports interconnected. Each path connecting the two devices contains an active section that forms part of a transceiver. The transceiver, which includes the active section and an electronic controller coupled thereto, selectively modulates, demodulates, and amplifies predetermined ones of the optical frequencies demultiplexes by the first frequency routing device.

This is only an example of the invention. The full scope of the invention entitled to an exclusionary right is set forth in the claims at the end of this application.

BRIEF DESCRIPTION OF THE DRAWINGS

FIG. 2 is a diagram illustrating the details of the frequency routing devices shown in FIG. 1.

DETAILED DESCRIPTION

Figure 1:
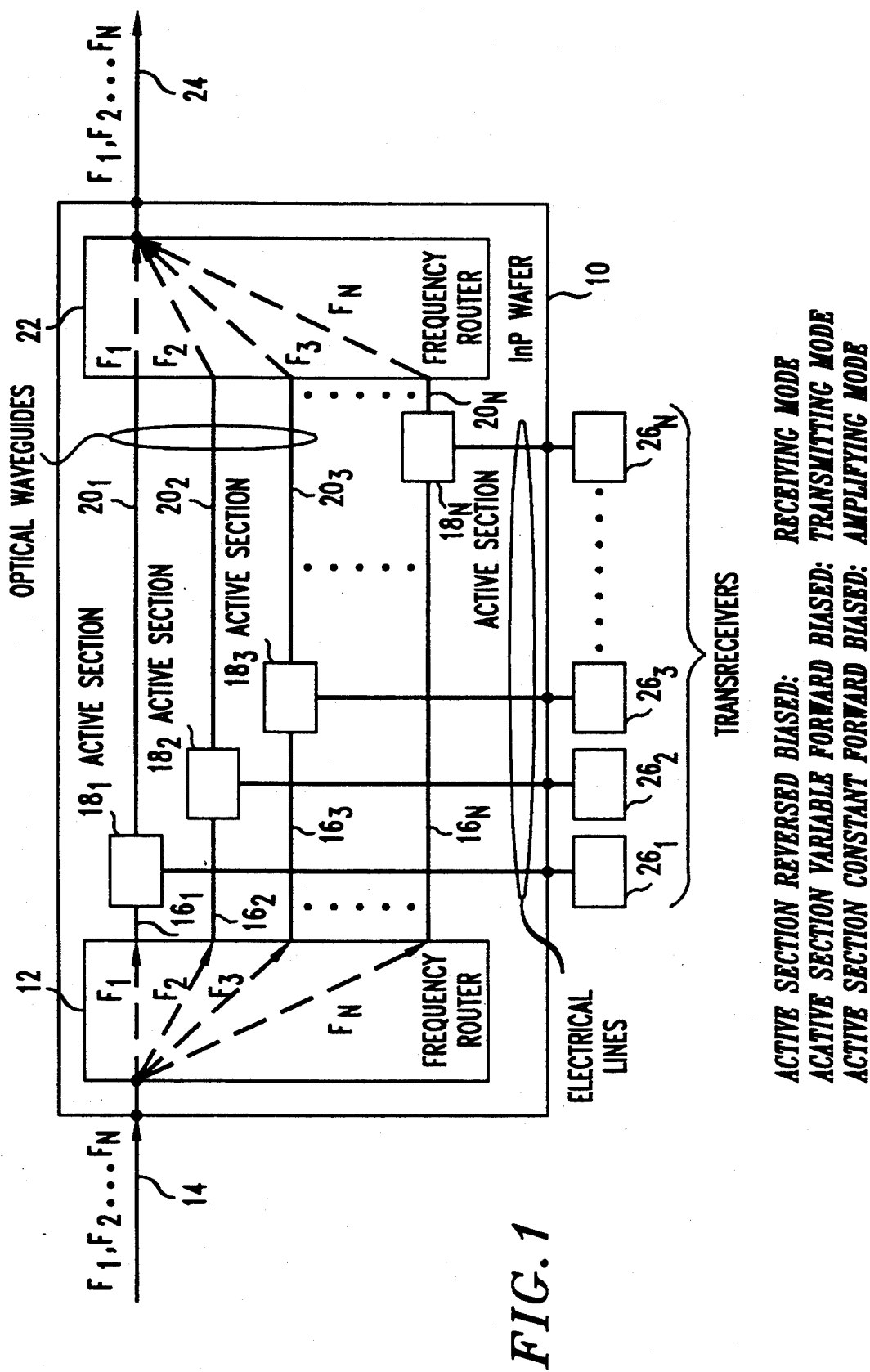
FIG. 1 is a diagram of an example of the tunable optical filter having integrated transceivers in accordance with this invention.

FIG. 1 shows an example of an optical filter which serves as a modulator, demodulator and an amplifier of optical frequencies. It is composed of frequency routing devices, waveguides, and transceivers. These structures may be monolithically integrated on a semiconductive wafer. They may be created by means of known photolithographic techniques.

FIG. 1 illustrates a wafer 10 made of a semiconductive material such as an indium phosphide based material such as InGaAsP. A first input frequency routing device 12 is defined on the wafer 10. The frequency routing device 12 may receive N multiplexed input optical frequencies $F_1, F_2, \ldots, F_N$ on a single input waveguide 14 defined on the wafer 10. The first frequency routing device 12 demultiplexes the input optical frequencies and directs each one of those frequencies into a separate output waveguide connected to the output of the frequency routing device 12. Specifically, frequency $F_1$ is directed to the output waveguide $16_1$, frequency $F_2$ is directed to the output waveguide $16_2$, and so on up to frequency $F_N$ which is directed to output waveguide $16_N$. Each of the output waveguides $16_1, 16_2, \ldots 16_N$ is directed to the input of a doped or active section of waveguide which serves as the optical component of a controllable transceiver.

Each controllable transceiver includes a doped or active section $18_1, 18_2, \ldots, 18_N$ of the waveguide and an electronic controller $26_1, 26_2, \ldots, 26_N$ respectively coupled thereto. The doping employed to form each doped section of the transceiver may be such that a suitable semiconductor junction is created. By properly biasing the doped sections with the application of electrical energy from the electronic controllers these doped sections may be employed as modulator, demodulators and amplifiers of the optical signals flowing through them.

For example, the active sections of waveguide act as photodiodes when a reverse bias or no bias is applied to them. The doped sections may thus be used as demodulators to detect information carried by the optical frequencies that flow through them. When a variable forward bias is applied to the doped sections they act as amplifiers with variable gain. Accordingly, in this mode the doped sections serve as amplitude modulators to transmit data at the carrier frequency which flow through them when the carrier frequency is received unmodulated. Finally, the doped sections can be biased with an appropriate amount of electrical energy to provide some degree of gain to the optical signals flowing through them. The level of gain can be adjusted to compensate for any transmission loss of the optical signal that occurs in the filter. In summary, the active sections do not simply serve as switches having only two discrete states (e.g., on and off). Rather, the active sections serve as analog devices which provide gain as a continuous function of a control signal (e.g., an information-bearing signal imposed on a carrier frequency). The details of creating the above-mentioned active sections in a wafer such as the indium phosphide wafer 10 shown in FIG. 1 are generally known, are not a part of this invention, and thus are not described here.

Referring again to FIG. 1, an output waveguide $16_1$ is directed to the input of an optically active section $18_1$, an output waveguide $16_2$ is directed to the input of an optically active section $18_2$, and so on up to an output waveguide $16_N$ directed to the input of an optically active section $18_N$.

The outputs of the active sections $18_1, 18_2, \ldots, 18_N$ are connected to respective input waveguides $20_1, 20_2, \ldots, 20_N$ of an output frequency routing device 22. The frequency routing device 22 will multiplex single frequencies appearing on the N input waveguides onto a single output waveguide 24, if all of the active sections between the input router 12 and the output router 22 are activated with electrical energy. If only one of the active sections is stimulated with electrical energy, then only the frequency flowing in that activated section will appear on the output waveguide 24. Accordingly, those frequency components which have been modulated or amplified by the active sections will be multiplexed on the output waveguide 24 while those frequency components which have been demodulated will not appear on the output waveguide 24. Thus, in addition to serving as a modulator, demodulator and amplifier, the device shown in FIG. 1 acts as an optical filter for the multiplexed input frequencies appearing on waveguide 14 when appropriate active sections are stimulated. Electronic controllers $26_1, 26_2, \ldots, 26_N$ are respectively provided for the active sections $18_1, 18_2, \ldots, 18_N$, which selectively apply electrical energy to the active sections for selectively modulating, demodulating and amplifying predetermined ones of the demultiplexes optical frequencies.

FIG. 2 shows the pertinent details of the routing devices 12 and 22 shown in FIG. 1. Both of those devices may have identical configurations. Each frequency routing device contains a plurality of input waveguides 26 connected to a free space region 28. A plurality of output waveguides 30 extends from the free space region 28 and is connected to an optical grating 32. The optical grating 32 comprises a plurality of unequal length waveguides which provides a predetermined amount of path length difference to a corresponding plurality of input waveguides 34 connected to another free space region 36. The free space region 36 is connected to a plurality of output waveguides 38. These frequency routing devices operate as multiplexers and demultiplexers of optical frequencies. The details of their construction and operation are more fully described in the U.S. patents referred to above, the entire contents of which are hereby incorporated by reference into this application. In the case of the frequency routing device 12, one of the input waveguides 26 is used as the input waveguide 14 of the device shown in FIG. 1 and the plurality of output waveguides 38 are used as the output waveguides $16_1, 16_2, \ldots, 16_N$. In the case of the frequency routing device 22, the plurality of input waveguides 26 are the input waveguides $20_1, 20_2, \ldots, 20_N$ shown in FIG. 1 and one of the output waveguides 38 is the output waveguide 24 shown in FIG. 1.

The device of FIG. 1 may be tuned to a large number of different optical frequencies used in high speed, high capacity optical communications networks. In particular, these devices are attractive for large size optical network applications based on frequency division multiplexing. In one particular application, the filter may be used in a network having a ring architecture which employs time division multiplexing and wavelength division multiplexing. Optical signals are generated at a terminal office by fixed-tuned lasers, each tuned to one of the frequency values demultiplexes by the tunable filters of the invention. The optical signals are modulated by an external modulator in series with each laser and then multiplexed in the optical fiber by a frequency router. The N frequency components provided by the laser define N frequency carriers that each carry interleaved time slots of data and cw carrier assigned successively to those users sharing the same carrier frequency. Each channel dropping filter provides connectivity to a different set of users sharing the same wavelength. Connectivity (e.g., modulation and demodulation) is achieved via an active section of the filter as described above.

I claim:

1. A tunable optical filter, comprising:
    an input frequency routing device having at least one input for receiving a plurality of multiplexed optical frequencies and producing demultiplexed optical frequencies;
    an output frequency routing device responsive to the input frequency routing device for producing an optical output;
    a plurality of pathways coupling the input frequency routing device to the output frequency routing device each having predeterminable gain control for selectively introducing gain to the pathways, wherein each of the plurality of pathways includes an active section selectively modulating, demodulating and amplifying the predetermined one or more of the demultiplexed optical frequencies.

2. The optical filter of claim 1 wherein each of the plurality of pathways comprises a plurality of waveguides connecting a plurality of outputs from the input frequency routing device to a plurality of inputs of the output frequency routing device.

3. The optical filter of claim 1, further comprising:
at least one electronic controller for selectively applying electrical energy to a predetermined one or more of the active sections for selectively modulating, demodulating and amplifying the predetermined one or more of the plurality of multiplexed optical frequencies.

4. The optical filter of claim 3 further comprising a plurality of electronic controllers each coupled to one of the active sections.

5. A tunable integrated optical filter, comprising:
an input frequency routing device having at least one input for receiving a plurality of multiplexed optical frequencies; and
an output frequency routing device responsive to the input frequency routing device for producing an optical output;
a plurality of pathways coupling the input frequency routing device to the output frequency routing device each having predeterminable gain control for selectively introducing gain to the pathways, said input frequency routing device including:
at least one input waveguide;
a first free space region coupled to the at least one input waveguide;
a plurality of output waveguides coupled to the first free space region;
an optical grating connected to the plurality of output waveguides comprising a plurality of unequal length waveguides;
a plurality of input waveguides connected to the optical grating;
a second free space region coupled to the plurality of input waveguides connected to the optical grating; and
a plurality of output waveguides coupled to the second free space region.

6. A tunable integrated optical filter, comprising:
an input frequency routing device having at least one input for receiving a plurality of multiplexed optical frequencies; and
an output frequency routing device responsive to the input frequency routing device for producing an optical output; and
a plurality of pathways coupling the input frequency routing device to the output frequency routing device each having predeterminable gain control for selectively introducing gain to the pathways, wherein said output frequency routing device includes:
a plurality of input waveguides;
a first free space region coupled to the plurality of input waveguides;
a plurality of output waveguides coupled to the first free space region;
an optical grating connected to the plurality of output waveguides comprising a plurality of unequal length waveguides;
a plurality of input waveguides connected to the optical grating;
a second free space region coupled to the plurality of input waveguides connected to the optical grating; and
at least one output waveguide coupled to the second free space region.

7. A tunable integrated optical filter, comprising:
an input frequency routing device having at least one input for receiving a plurality of multiplexed optical frequencies; and
an output frequency routing device responsive to the input frequency routing device for producing an optical output; and
a plurality of pathways coupling the input frequency routing device to the output frequency routing device each having predeterminable gain control for selectively introducing gain to the pathways; at least one electronic controller for selectively applying electrical energy to a predetermined one or more of the active sections selectively modulating, demodulating and amplifying the predetermined one or more of the plurality of multiplexed optical frequencies, and wherein said input and output frequency routing devices each include:
a plurality of input waveguides;
a first free space region coupled to the plurality of input waveguides;
a plurality of output waveguides coupled to the first free space region;
an optical grating connected to the plurality of output waveguides comprising a plurality of unequal length waveguides;
a plurality of input waveguides connected to the optical grating;
a second free space region coupled to the plurality of input waveguides connected to the optical grating; and
at least one output waveguide coupled to the second free space region.

8. The optical filter of claim 7 wherein each of the plurality of output waveguides of the input frequency routing device are connected to a respective one of the plurality of input waveguides of the output frequency routing device by means of one of the active sections.

9. A tunable integrated optical filter, comprising:
an input frequency routing device having at least one input for receiving a plurality of multiplexed optical frequencies;
an output frequency routing device responsive to the input frequency routing device for producing an optical output; and
a plurality of pathways coupling the input frequency routing device to the output frequency routing device each having a selectively activatable transceiver wherein each of said transceivers comprises an optically active section coupled to an electronic controller for selectively modulating, demodulating, and amplifying optical frequencies.

* * * * *